United States Patent
Muth et al.

(10) Patent No.: US 7,720,864 B1
(45) Date of Patent: May 18, 2010

(54) EXPIRATION OF ACCESS TOKENS FOR QUIESCING A DISTRIBUTED SYSTEM

(75) Inventors: John A. Muth, Scotts Valley, CA (US); Thomas W. Lanzatella, Minneapolis, MN (US)

(73) Assignee: Symantec Operating Corporation, Mountain View, CA (US)

( * ) Notice: Subject to any disclaimer, the term of this patent is extended or adjusted under 35 U.S.C. 154(b) by 628 days.

(21) Appl. No.: 10/809,207

(22) Filed: Mar. 25, 2004

(51) Int. Cl.
*G06F 17/30* (2006.01)

(52) U.S. Cl. ...................... 707/785; 707/707; 709/228; 713/185

(58) Field of Classification Search ............... 707/9, 707/1, 10; 717/11; 713/186
See application file for complete search history.

(56) References Cited

U.S. PATENT DOCUMENTS

| | | | | |
|---|---|---|---|---|
| 6,029,160 | A * | 2/2000 | Cabrera et al. ................. | 707/1 |
| 6,314,425 | B1 * | 11/2001 | Serbinis et al. ................ | 707/10 |
| 6,374,402 | B1 * | 4/2002 | Schmeidler et al. .......... | 717/167 |
| 6,466,982 | B1 * | 10/2002 | Ruberg ......................... | 709/227 |
| 6,564,215 | B1 | 5/2003 | Hsiao et al. | |
| 6,675,268 | B1 * | 1/2004 | DeKoning et al. ........... | 711/151 |
| 6,965,993 | B2 * | 11/2005 | Baker ........................... | 713/153 |
| 6,983,295 | B1 * | 1/2006 | Hart ............................. | 707/204 |
| 6,985,914 | B2 * | 1/2006 | Venkatesh et al. ........... | 707/200 |
| 7,028,090 | B2 * | 4/2006 | McBrearty et al. .......... | 709/229 |
| 7,035,854 | B2 * | 4/2006 | Hsiao et al. ................... | 707/9 |
| 2003/0177370 | A1 * | 9/2003 | Smith ........................... | 713/186 |
| 2003/0187993 | A1 * | 10/2003 | Ribot ............................ | 709/227 |
| 2003/0200202 | A1 | 10/2003 | Hsiao et al. | |
| 2004/0015585 | A1 * | 1/2004 | McBrearty et al. .......... | 709/225 |

OTHER PUBLICATIONS

Bhattacharya et al., "Coordinating Backup/Recovery and Data Consistency Between Database and File Systems," ACM SIGMOD'2002, Jun. 4-6, 2002, (pp. 500-511).
Bela Ban, "Overview of HSQLDB Replication (HSQLDB/R)," Aug./Sep. 2002, 10 pages.

* cited by examiner

*Primary Examiner*—Sathyanarayan Pannala
(74) *Attorney, Agent, or Firm*—Robert C Kowert; Meyertons, Hood, Kivlin, Kowert & Goetzel, P.C.

(57) ABSTRACT

A method, system and computer accessible medium for expiring access tokens in preparation for freezing file images. A metadata server may maintain a next scheduled quiesce time and may issue access tokens configured to expire before the next scheduled quiesce time. A metadata server may set an access token's expiration time to a maximum expiration time indicated by the next scheduled quiesce time or may set an access token's expiration time to a default expiration time if the default expiration time is earlier than the maximum expiration time. A storage device may recognize and enforce the access token's expiration time.

14 Claims, 6 Drawing Sheets

EXPIRATION OF ACCESS TOKENS FOR QUIESCING A DISTRIBUTED SYSTEM

BACKGROUND OF THE INVENTION

1. Field of the Invention

This invention relates generally to data storage management, and more particularly to a method and system for the expiration of access tokens prior to file I/O quiescing.

2. Description of the Related Art

Modern distributed shared storage environments may include many storage objects connected via an interconnection network. An interconnection network provides the infrastructure to connect the various elements of a distributed shared storage environment. Within the storage environment, file system abstractions may be built on top of volumes that may be distributed across multiple storage devices. As the number of volumes and file system abstractions grows, the complexity of the entire storage environment grows dramatically.

In order to limit bottlenecking and the resulting restricted data throughput, distributed shared storage environments may separate the actual storage of data from the management of that data. Storage architectures that employ this technique are generally referred to as out-of-band or asymmetric systems. A metadata server (MDS) generally supplies the required data management and control functions including, among others, file system mapping, data mirror synchronization, client authentication and access privileges. An MDS can provide this metadata to other devices, processes, and applications. The data itself can be stored on various storage devices attached to the network, but not necessarily connected directly to the MDS. Such storage devices provide data storage functions without having to worry about the metadata and file system management.

Applications, or clients, initially contact the MDS to request access to a specific file or dataset. The MDS may, after authenticating the client node and applying whatever data access policies are relevant, provide the requesting client node with information about what storage device contains that particular dataset and with an access token to present to the storage device. Client nodes may then communicate directly with the storage device, presenting access tokens when reading or writing data. The access token, or capability, generally describes the access rights of the client, and may, through the use of digital signatures, provide proof that the access token was generated by the MDS and has not been modified.

Separating data from its associated metadata allows the actual data traffic to be routed directly to storage devices and may prevent the MDS from becoming a bottleneck and limiting the total amount of data throughput. This architecture may also allow the MDS to be optimized for metadata lookups that usually involve smaller reads and writes, while allowing the storage devices themselves to be optimized for larger transfers of data.

In distributed shared storage environments where multiple clients may need simultaneous access to the same data, datasets may be fixed into specific versions to ensure data integrity across client sessions. These dataset versions may be referred to as file images. Certain tasks, like backing up one or more files, checking and correcting data consistency across mirrored database files, or virus removal may require a single application or process to have exclusive access to one or more file images. Typically, general access to the datasets involved must be quiesced and all data caches must be flushed. Freezing the I/O to a specific file or dataset image in a shared storage environment may require the MDS to individually cancel all current access tokens by transmitting recall or revocation messages to every client that has been issued access tokens for the image. Revoking access tokens individually may be burdensome with numerous outstanding tokens.

SUMMARY

When quiescing data I/O in a distributed shared storage environment, a metadata server (MDS) may set the expiration time on issued access tokens to be no later than a scheduled quiesce time. The MDS may maintain one or more scheduled quiesce times. Client applications requiring exclusive access to files or datasets may contact a MDS and request a quiesce time. The MDS may use the scheduled quiesce to determine whether to set the expiration time in access tokens using a default expiration time, or to use an expiration time based upon the next scheduled quiesce time. Storage devices may recognize and enforce expiration times in tokens. Storage devices may deny data I/O requests from clients presenting expired access tokens. Trusted applications may schedule quiesce times to perform systems tasks such as file backup and recovery, mirror synchronization, database repair and compacting, among others. The MDS may provide an interface to allow such clients to schedule a quiesce time. When quiescing data I/O, the MDS may use expiration times in access tokens to avoid sending an individual revocation message to each client for each access token held by that client, and may assume that all relevant access tokens have expired at or prior to the quiesce time.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
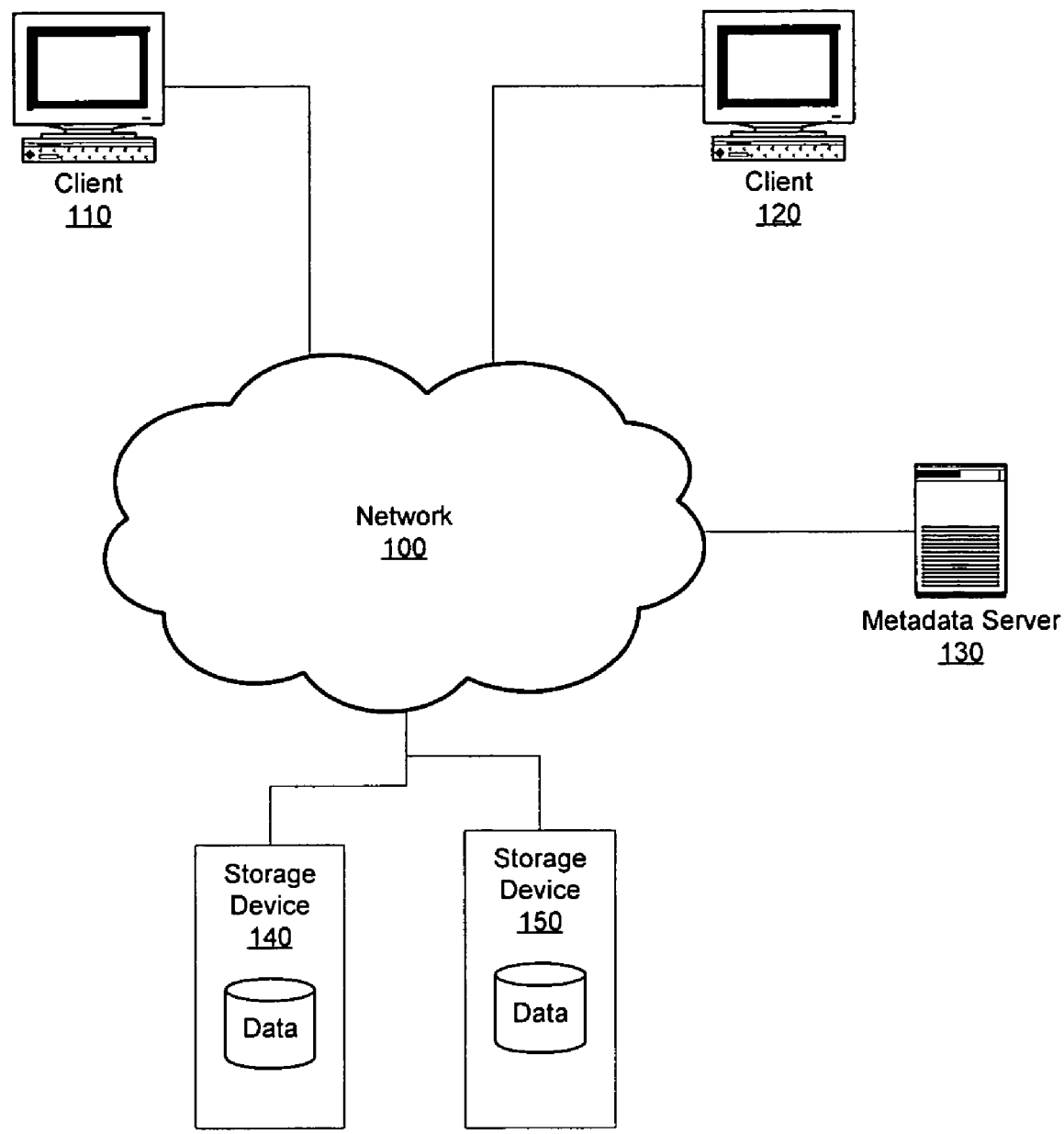
FIG. 1 illustrates, according to one embodiment, a networked system including various computer devices that may be configured to implement the expiration of access tokens for scheduled I/O quiescing.

FIG. 1 illustrates a computer network, according to certain embodiments, in which one or more devices may be configured to implement a distributed shared storage environment that may utilize the expiration of access tokens to quiesce data I/O to file images for frozen image generation, backups, mirror synchronization and other tasks requiring exclusive file image access. The quiescing of data I/O may be scheduled in advance, in some embodiments. Quiesce times may be scheduled to occur periodically, or may be scheduled individually or otherwise, according to various embodiments. In one embodiment, at least one computing device on a network 100 may be a client device, such as Client 110 or Client 120 with installed software that may be configured to communicate with other devices, acquire access tokens, and exchange data with data storage devices. In one embodiment, at least one computing device on Network 100 may be a server device, such as Metadata Server 130 with installed software that may be configured to maintain a scheduled quiesce time and to provide access tokens with expiration times. According to another embodiment, one or more devices may be data storage devices, such as Storage Devices 140 and Storage Device 150. Storage Device 140 or Storage Device 150 may be configured to provide data storage and retrieval services to client devices, such as Client 110 and Client 120. In some embodiments, Storage Device 140 or Storage Device 150 may be an object-based storage device (OSD). In other embodiments, Storage Device 140 or Storage Device 150 may be a network attached storage (NAS) device, or a node on a Storage Area Network (SAN). In one embodiment, Storage Device 140 may be one type of storage device while Storage Device 150 may be another.

In one embodiment, Metadata Server 130 may be configured to maintain a next scheduled quiesce time. In certain embodiments, Metadata Server 130 may maintain multiple quiesce times, each for a different file image or dataset. Metadata Server 130 may set a next scheduled quiesce time in response to receiving a request from another device, application or process. Metadata Server 130 may expose a set of functions, or other API, to allow other application to request quiesce times, according to one embodiment. Metadata Server 130 may also be configured to communicate and exchange data with a storage device, such Storage Device 140 or Storage Device 150, and may schedule its own quiesce times. A client device, such as Client 110 or Client 120, may be configured to communicate with Metadata Server 130 and request an access token that may grant access privileges to data stored on Storage Device 140 or Storage Device 150, according to one embodiment. Metadata Server 130 may in turn generate an access token and may set the access token's expiration time such that the access token expires prior to the next scheduled quiesce time. Metadata Server 130 may determine a maximum expiration time indicated by the next scheduled quiesce time. Metadata Server 130 may also maintain a default expiration time and may, according to certain embodiments, set an access token's expiration time to the default expiration time if the default expiration time is earlier than the maximum expiration time.

A client, such as Client 110 or Client 120, may present an access token with an expiration time, provided by Metadata Server 130 when communicating with Storage Device 140 for data storage or retrieval, in some embodiments. Storage Device 140 may enforce the expiration time of a client's access token when a client has requested a data storage service.

A client device, such as Client 110 or Client 120, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable of communicating with processes or devices in a distributed shared storage environment.

Network 100, as illustrated in FIG. 1, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OSD), or other asymmetric, out-of-band, or shared storage models.

A server device, such as Metadata Server 130, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable communicating with other processes or devices in a distributed shared storage environment. Metadata Server 130 may be configured to couple over network 100 to one or more other devices via one or more wired or wireless network interfaces.

A storage device, such as Storage Device 140, may be any type of networkable computing device with a digital heartbeat capable communicating with and providing data storage services to other devices or processes in a distributed shared storage environment. According to various embodiments, Storage Device 140 may be configured to implement any of numerous data storage models including but not limited to, storage-network attach, storage-network aggregation (SNA), network attached storage (NAS), storage area network (SAN), Redundant Array of Independent (or Inexpensive)

Disks (RAID), or object-based storage device (OSD). In certain embodiments, Storage Device 140 may be configured to implement a combination of different data storage models. Storage Device 140 may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

Figure 2:
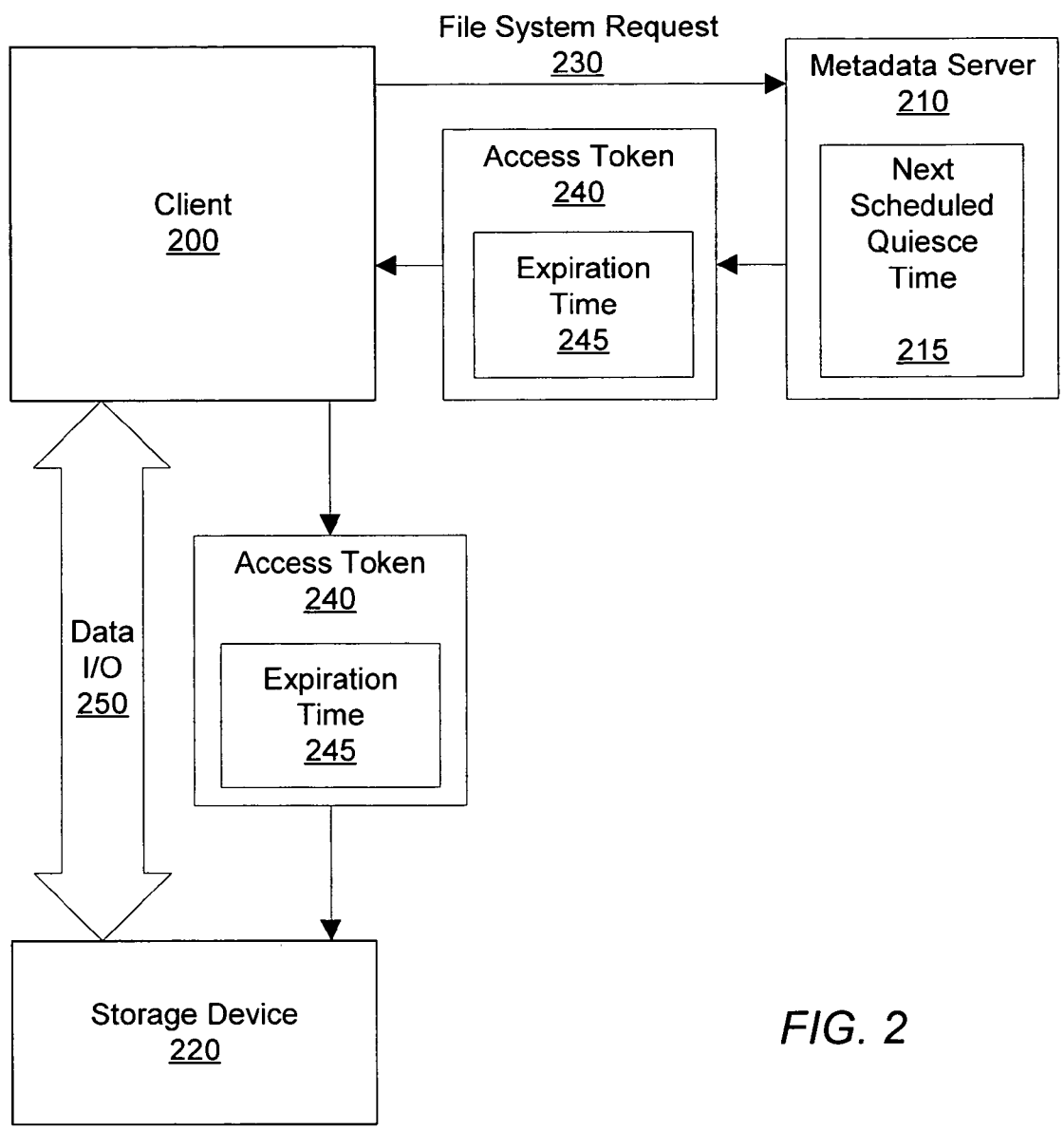
FIG. 2 is a block diagram illustrating, in one embodiment, the interaction among networked devices employing expiration times in access tokens.

Turning now to FIG. 2, which illustrates the coordination and communication between various networked devices according to one embodiment. In addition, FIG. 2 illustrates a means for receiving a file system request from a client and a means for transmitting the access token to the client. In one embodiment, Client 200 may communicate with Metadata Server 210, using File System Request 230. File System Request may indicate the data that Client 200 wishes to access. That data may reside on Storage Device 220. In response, according to this embodiment, possibly after authenticating Client 200, Server 210 may return Access Token 240 and may supply any other metadata necessary for Client 200 to read or write the requested data. For example, in one embodiment, Storage Device 220 may be an object-based storage device and Server 210 may provide Client 200 with the network address of Storage Device 200 as well as a user object that appropriately identifies to Storage Device 220 the data to which Client 200 requests access.

In such an embodiment, Access Token 240 may include an expiration time, such as Expiration Time 245, set by Metadata Server 210. Metadata Server 210 may set Expiration Time 245 according to the time indicated by Next Scheduled Quiesce Time 215. In one embodiment, Next Scheduled Quiesce Time 215 may be one of many scheduled quiesce times for different datasets or file images. Metadata Server may set the expiration times of different access tokens according to times indicated by different scheduled quiesce times based on the specific datasets or file images involved. Client 200 may then communicate with Storage Device 220 in order to perform some data I/O. According to one embodiment, Client 200 may include Access Token 240 in its communications with Storage Device 220. Storage Device 240 may use Expiration Time 245 to determine whether or not to perform the requested data I/O. If, according to such an embodiment, Storage Device 220 decides to allow the requested data I/O, Storage Device 200 may complete the I/O requested by Client 200, as illustrated by Data I/O 250. For descriptive clarity only, FIG. 2 illustrates Client 200 supplying Access Token 240 to Storage Device 220 separately from Data I/O 250. Client 200 may include Access Token 240 in some or all communications with Storage Device 220, or may combine Data I/O 250 and Access Token 240 in one communication event, according to various embodiments. In certain embodiments, Client 200 may be "trusted" and therefore may be configured to know when its access token expires and be responsible for voluntarily relinquishing the access token.

In certain embodiments, Client 200, Metadata Server 210, and Storage Device 220 may execute on separate devices, but in other embodiments, one or more processes on a single device may perform some or all of the functions of Client 200, Metadata Server 210 and Storage Device 220. In certain embodiments, Client 200, Metadata Server 210, and Storage Device 220 may represent a logical division of functionality performed by one or more separate modules of a single application.

FIG. 2 illustrates just one of many possible embodiments. In other embodiments, Metadata Server 200 may communicate with another process to determine the time of Next Scheduled Quiesce Time 215. According to one embodiment illustrated by FIG. 2, Metadata Server 210 uses a timestamp, such as Expiration Time 245, to indicate when Access Token 240 expires. In other embodiments, Metadata Server 210 may communicate this information using different methods. For example, Metadata Server 210 may include a unique identifier in Access Token 240 that can then be used in conjunction with other information to determine whether Access Token 240 has expired. Rather than including a timestamp representing the expiration time, Metadata Server 210 may include a timestamp representing the time that Access Token 240 was generated and a time span representing the maximum lifetime of Access Token 240. According to one embodiment, Storage Device 220 may comprise an object based storage device and expiration time 245 may be included as part of a cryptographically secure capability or digital signature provided by Metadata Server 210 to Client 200.

Figure 3:
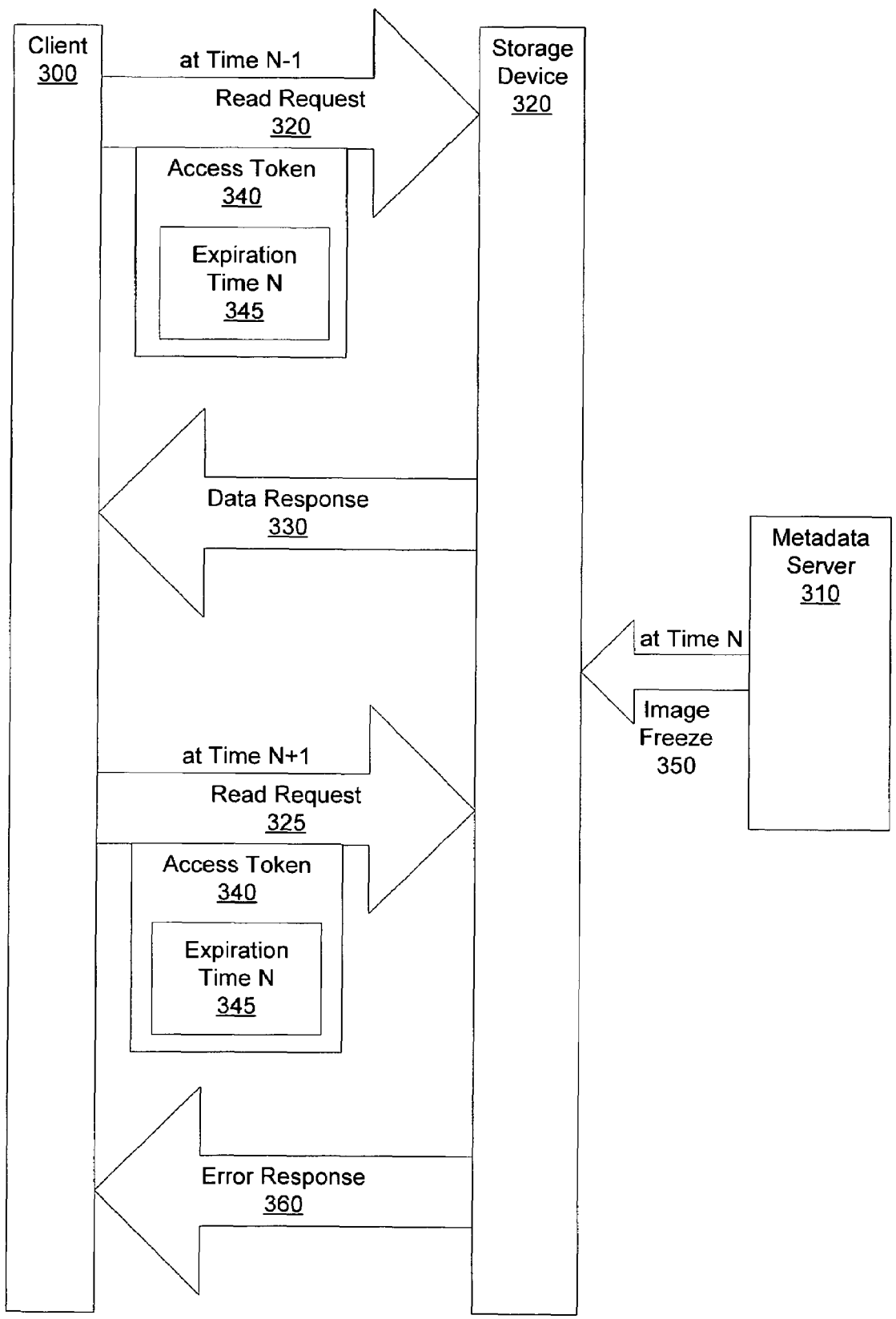
FIG. 3 illustrates, according to one embodiment, the use of an access token including an expiration time.

FIG. 3 illustrates one method whereby a client and a storage object may use an access token with an expiration time, according to one embodiment. Additionally, FIG. 3 illustrates a means for receiving a data I/O request associated with the access token, a means for comparing a current system time with the access token's expiration time, and a means for denying the data I/O request if the current system time is later than the access token's expiration time. According to one embodiment, a client, such as Client 300, may present an access token when requesting data from a storage device, such as Storage Device 220. In response to a client request, such a storage device may examine or analyze the expiration time of the access token to determine whether the access token has expired. In such an embodiment, Client 300 may make Read Request 320 at time N−1 using Access Token 340 with Expiration Time 345. Expiration Time 345 may indicate that Access Token 340 expires at time N. Storage Device 320 may compare the time of Read Request 320 (N−1) with Expiration Time 345 (N) to determine whether or not to allow Read Request 320, according to one embodiment. According to such an embodiment, Storage Device 320 may allow Read Request 320 and return Data Response 330 to Client 300.

According the embodiment described above, Storage Device 320 may enforce the expiration of Access Token 340 by comparing two timestamps, that of the current time, and that of the access token's expiration time. In other embodiments it may rely upon additional means or methods to aid in determining whether Access Token 340 has expired. For example, in one embodiment, Storage Device 320 may rely upon some other mechanism, which may involve forwarding Access Token 340 to one or more additional, trusted processes for examination or authentication, to determine whether Access Token 340 has expired. Expiration Time 345 may be encrypted for security reasons thus requiring Storage Device 320 to forward Access Token 340 to a trusted process, running on the same or a separate device, for decryption and examination. In another example, according to a different embodiment, Storage Device 320 may forward Access Token 240 to Metadata Server 310 for evaluation.

Metadata Server 310 may, according to one embodiment, perform Image Freeze 350 at Time N, and may assume that Access Token 340 has expired and therefore, that Client 300 cannot access data on Storage Device 320 during Image Freeze 350. The exact nature of Image Freeze 350 may vary from embodiment to embodiment. In certain embodiments, Metadata Server 310 may initiate Image Freeze 350 by sending a message to Storage Device 320, thereafter relying upon Storage Device 320 to perform the details of Image Freeze 350. According to other embodiments, Metadata Server 310 may perform all the functionality involved in Image Freeze 350. In other embodiments, Image Freeze 350 may be performed by a device or process other than Metadata Server 310. For example, a trusted client application, such as a backup program may actually initiate Image Freeze 350. Image Freeze 350, as illustrated in FIG. 3, is not intended to be limited to any particular method of frozen image creation and may involve file image overlays, copy on write processing, setting I/O permissions to read only or any of a number of other methods, depending upon the specific embodiment. In certain embodiments, Image Freeze 350 may involve other storage devices in addition to Storage Device 320. For example, Image Freeze 350 may involve multiple storage devices to provide the total amount of physical storage media, or to provide a separate mirror storage device, or may involve additional metadata servers, accordingly to the specific nature of various embodiments. Image Freeze 350 is just one of many reasons why a quiesce time may be scheduled and why access tokens may expire. In one embodiment, a trusted application may perform a file system backup at the scheduled quiesce time. In other embodiments, a system security program may perform virus detection and eradication at Time N.

FIG. 3 also illustrates, according to one embodiment, the use of an expired access token between a client and a storage object. In such an embodiment, Client 300 may issue Read Request 325 at Time N+1 using Access Token 340 with Expiration Time 345 that may indicate that Access Token 340 expires at or prior to time N. Metadata Server 310 may have initiated Image Freeze 350 at time N, as described above. Storage Device 320 may compare the time of Read Request 325 (N+1) with the time indicated by Expiration Time 345 (N) in Access Token 340 to determine whether or not to allow Read Request 325. According to one embodiment, Storage Device 320 may prevent Read Request 325 and respond with Error Response 360.

According to one embodiment, Storage Device 320 may determine that Access Token 340 has expired by examining Expiration Time 345 and may return an error message to Client 300 indicating that Access Token 340 has expired. In other embodiments, Storage Device 320 may not inform Client 300 that Access Token 340 has expired.

FIG. 3 illustrates just one out of many possible embodiments. Different embodiments may perform the actions and methods illustrated in FIG. 3 differently or in orders different from those illustrated in FIG. 3. For example, in some embodiments, Storage Device 320 may respond to Read Request 325 in a manner different than Error Response 360. Storage device 320, according to one embodiment, may not send any response at all in response to Read Request 325. In other words, after determining that Access Token 340 is expired, Storage Device 320 may or may not inform other devices or processes, such as Client 300, of the expired nature of Access Token 340, according to various embodiments.

Figure 4A:
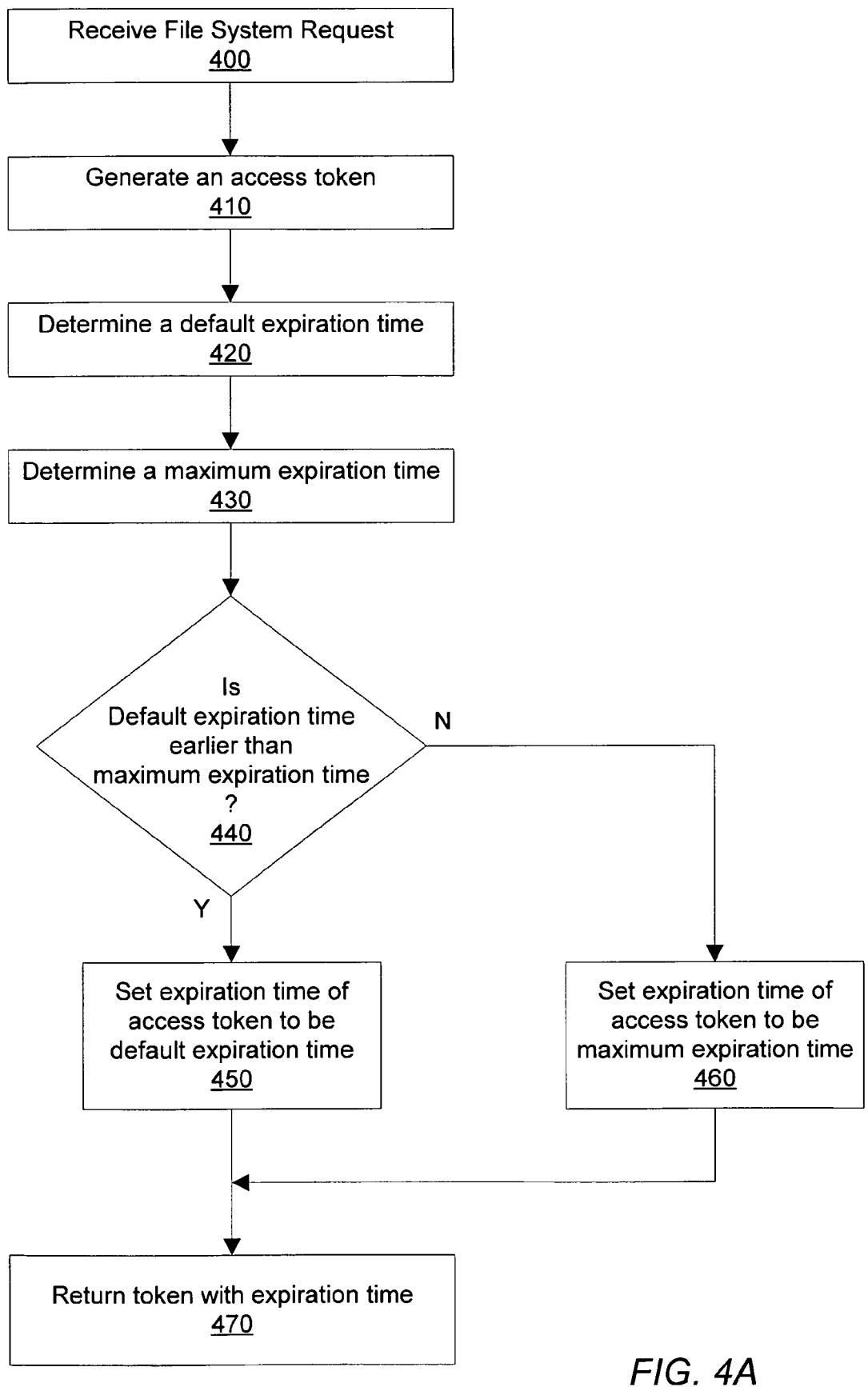
FIG. 4A is a flow diagram, per one embodiment, illustrating a method for a MDS to implement the expiration of access tokens for scheduled I/O quiescing.

FIG. 4 is a flow diagram, according to one embodiment, illustrating a method for a metadata server to provide access tokens that expire prior to a scheduled quiesce time. FIG. 4 also illustrates a means for setting the expiration time of an access token to the earlier of either a maximum expiration time indicated by a next scheduled quiesce time, or a default expiration time. According to such an embodiment, a metadata server may receive a file system request as shown in Block 400. A file system request may take many forms, but according to one embodiment, may be a request for a client process to access a particular file. After possibly authenticating both the request and the client process, the metadata server may, in one embodiment, generate an access token, as shown in Block 410 and determine a default expiration time, as shown in Block 430. A default expiration time may, according to various embodiments, be set by a system administrator, be calculated by the metadata server, and may vary from storage device to storage device, or from client to client.

The metadata server may, in one embodiment, determine a maximum expiration time, as shown in Block 430. In one embodiment, the metadata server may use the time indicated by a next scheduled quiesce to determine a maximum expiration time, and may ensure that the maximum expiration time is no later than the time of the next scheduled quiesce. Before setting the expiration time of the access token, the metadata server may compare the default expiration time to the maximum expiration time as shown in decision Block 440. Then, according to one embodiment, the metadata server may set the expiration time of the access token to the default expiration time, as shown in Block 450, if the default expiration time is earlier than the maximum expiration time, and may set the expiration time of the access token to be the maximum expiration time, as shown in Block 460, if the default expiration time is not earlier than the maximum expiration time. After setting the expiration time in the access token, the metadata server may resume normal processing as shown in Block 470.

Figure 4B:
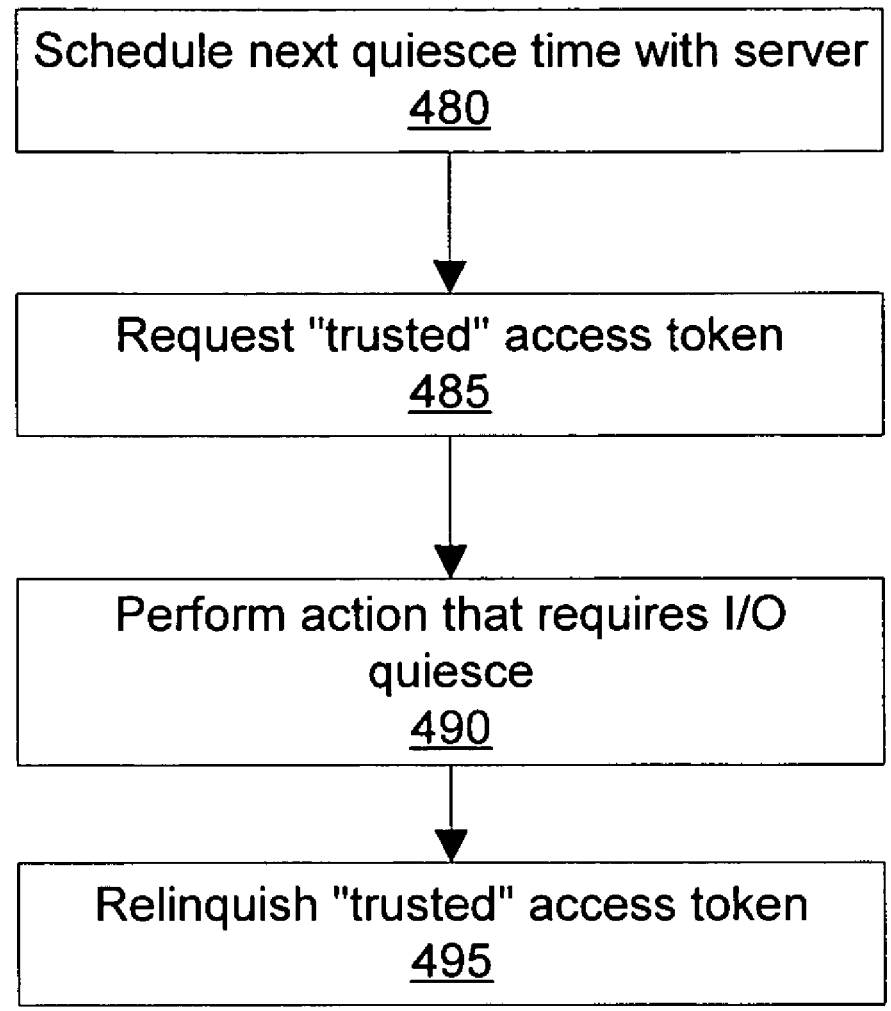
FIG. 4B is a flow diagram, according to one embodiment, illustrating a method for a client to schedule an I/O quiesce and utilize access token expiration to gain exclusive access to a file image.

FIG. 4B, illustrates, according to one embodiment a method for a client to schedule a quiesce time. A client, such as Client 100, may be a trusted client responsible for tasks that require exclusive access to certain files or dataset images. For example, a backup program needs to be sure that a file isn't being changed at the same time it is being backed up. In one embodiment, a client may contact a metadata server, such as Metadata Server 130 and request the scheduling of a quiesce time, as illustrated in block 480. In response to such request a metadata server may verify that the client is allowed to schedule a quiesce time and if so, the metadata server may set a next scheduled quiesce time, such as Next Scheduled Quiesce Time 215 illustrated in FIG. 2. After scheduling the quiesce time, the client may wait, possibly performing other tasks, until the scheduled quiesce time.

In one embodiment, Client 100 may, at the scheduled quiesce time, contact the metadata server to request a "trusted" access token for the appropriate file images, as illustrated by block 485. In one embodiment, such a request for a "trusted" access token may inform the metadata sever not to issue any other access tokens for the same dataset or file images, ensuring that the client has exclusive access while it holds the trusted access token since previously granted tokens are known to have expired by the scheduled quiesce time. In some embodiments, the trusted access token may not expire. In other embodiments, a trusted client may request a normal access token, but inform the metadata server not to issue any other access tokens for the appropriate images. The client may then perform the specific action that required the I/O quiesce, as illustrated in block 490. In various embodiments, this may include backing up a file, comparing mirror images, virus detection, or other tasks. When the client has finished whatever processes require quiescing all other I/O to the dataset or file image, it may then relinquish the "trusted" access token, as illustrated in block 495, or otherwise inform the metadata server that it can now return to normal metadata processing and access token granting. In one embodiment, the metadata server may then begin setting the expiration times in access tokens based upon the next scheduled quiesce time.

Figure 5:
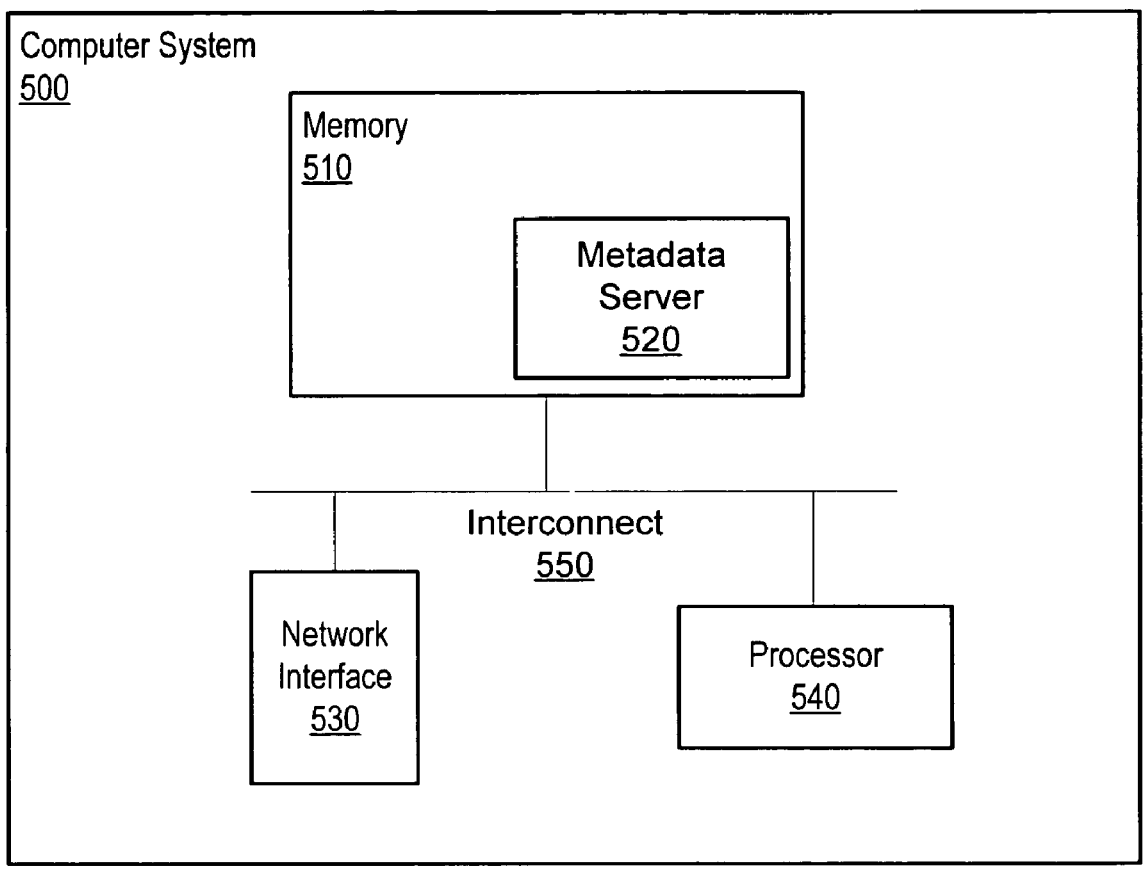
FIG. 5 is a block diagram illustrating, according to one embodiment a computer system that may be configured to implement the expiration of access tokens for scheduled I/O quiesces.

FIG. 5 illustrates a computing system capable of implementing access tokens that expire prior to a scheduled quiesce time, according to various embodiments. Computer system 500 may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat. Computer system 500 may include at least one Processor 540. Processor 540 may couple across Interconnect 550 to Memory 510 and Network Interface 530. Network Interface 530 may be any of various types of interfaces configured to couple with and communicate over Network 100 illustrated in FIG. 1 and described above.

Memory 510 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, Memory 510 may include program instructions configured to maintain a next scheduled quiesce time and utilize expiration times in access tokens to ensure that the access tokens expire prior to the next scheduled quiesce time. In one embodiment Memory 510 may include program instructions configured to implement a metadata server, such as Metadata Server 520, as shown in block 520. In such an embodiment, Metadata Server 520 may include program instructions configured to maintain a next scheduled quiesce time and utilize expiration times in access tokens to ensure that the access tokens expire prior to the next scheduled quiesce time. In other embodiments, Memory 510 may include program instructions configured to implement a client, such as Client 110 or Client 120, described above. In such embodiments, Client 110 or Client 120, may be configured to schedule a quiesce time and may be a trusted client configured to perform data IO requiring the quiescing of other clients.

Although the embodiments above have been described in detail, numerous variations and modifications will become apparent once the above disclosure is fully appreciated. It is intended that the following claims be interpreted to embrace all such variations and modifications.

What is claimed is:

1. A computer-implemented method, comprising:
in response to a metadata server receiving a data access request from one of a plurality of clients, the metadata server:
determining a maximum expiration time indicated by a next scheduled time for exclusive access;
wherein the data access request is for data that is also accessible by one or more other clients of the plurality of clients each having a corresponding unexpired token, and wherein said time for exclusive access is a time when exclusive access to the data is required by a task;
generating an access token that grants the client access to data stored on one or more storage devices associated with the metadata server, wherein the access token comprises an expiration time, wherein the access token is one of a plurality of access tokens each provided to a respective one of the plurality of clients; and
wherein said generating an access token comprises setting the expiration time of the access token to no later than the maximum expiration time indicated by the next scheduled time for exclusive access, such that the access token will be expired during the next scheduled time for exclusive access, thus preventing the client from using the access token to access the data during the next scheduled time for exclusive access, wherein at the next scheduled time for exclusive access the plurality of access tokens are expired without the metadata server transmitting a message to each client to expire its respective access tokens.

2. The computer-implemented method of claim 1, further comprising:
determining a default expiration time; and
if the default expiration time is earlier than the maximum expiration time, setting the expiration time of the access token to the default expiration time.

3. The computer-implemented method of claim 1, further comprising the metadata server providing the access token to the client.

4. The computer-implemented method of claim 3, further comprising:
a storage device receiving a data I/O request associated with the access token;
comparing a current system time with the access token's expiration time;
denying the data I/O request if the current system time is later than the access token's expiration time.
tokens are expired without the metadata server transmitting a message to each client to expire its respective access tokens.

5. A system, comprising:
a processor and a memory storing program instructions executable by the processor to implement a metadata server, wherein the metadata server is configured to:
determine a maximum expiration time indicated by a next scheduled time for exclusive access in response to receiving a data access request from a client, wherein the client is one of a plurality of clients;
wherein the data access request is for data that is also accessible by one or more other clients of the plurality of clients each having a corresponding unexpired token, and wherein said time for exclusive access is a time when exclusive access to the data is required by a task;
generate an access token that grants the client access to data stored on one or more storage devices associated with the metadata server, wherein the access token comprises an expiration time, wherein the access token is one of a plurality of access tokens each provided to a respective one of the plurality of clients; and
set the expiration time of the access token to no later than the maximum expiration time such that the access token will be expired during the next scheduled time for exclusive access, thus preventing the client from using the access token to access the data during the next scheduled time for exclusive access, wherein at the next scheduled time for exclusive access the plurality of access tokens are expired without the metadata server transmitting a message to each client to expire its respective access tokens.

6. The system of claim 5, wherein the metadata server is further configured to:
   determine a default expiration time; and
   set the expiration time of the access token to the default expiration time if the default expiration time is earlier than the maximum expiration time.

7. The system of claim 5, further comprising a storage device, wherein the storage device is configured to:
   receive a data I/O request associated with the access token;
   compare a current system time with the access token's expiration time; and
   deny the data I/O request if the current system time is later than the access token's expiration time.

8. The system of claim 7, wherein the metadata server is further configured to:
   provide the access token to the client.

9. The system of claim 8,
   wherein the metadata server is further configured to:
   provide one access token of the plurality of access tokens to a respective one of a plurality of clients.

10. A computer-readable, storage medium having stored program instructions that when executed by a computer implement:
    a metadata server determining a maximum expiration time indicated by a next scheduled time for exclusive access;
    generating an access token that grants one of a plurality of clients access to data stored on one or more storage devices associated with the metadata server, wherein the access token comprises an expiration time, wherein the data is also accessible by one or more other clients of the plurality of clients each having a corresponding unexpired token, wherein the access token is one of a plurality of access tokens each provided to a respective one of the plurality of clients, and wherein said time for exclusive access is a time when exclusive access to the data is required by a task; and
    setting the expiration time of the access token to no later than the maximum expiration time such that the access token will be expired during the next scheduled time for exclusive access, thus preventing the client from using the access token to access the data during the next scheduled time for exclusive access, wherein at the next scheduled time for exclusive access the plurality of access tokens are expired without the metadata server transmitting a message to each client to expire its respective access tokens.

11. The computer-readable, storage accessible medium of claim 10, wherein the program instructions are further computer-executable to implement:
    determining a default expiration time; and
    if the default expiration time is earlier than the maximum expiration time, setting the expiration time of the access token to the default expiration time.

12. The computer-readable, storage accessible medium of claim 10, wherein the program instructions are further computer-executable to implement:
    receiving a data I/O request associated with the access token;
    comparing a current system time with the access token's expiration time; and
    denying the data I/O request if the current system time is later than the access token's expiration time.

13. The computer-readable, storage accessible medium of claim 12, wherein the program instructions are further computer-executable to implement:
    receiving a data access request from the client; and
    providing the access token to the client.

14. A system, comprising:
    means for determining a default expiration time;
    means for setting the expiration time of an access token to the earlier of either a maximum expiration time indicated by a next scheduled time for exclusive access or the default expiration time, wherein the access token grants one of a plurality of clients access to data stored on one or more storage devices associated with a metadata server, wherein the access token is one of a plurality of access tokens each provided to a respective one of the plurality of clients, and wherein the access token is set such that the access token will be expired during the next scheduled time for exclusive access, thus preventing the client from using the access token to access the data during the next scheduled time for exclusive access, wherein at the next scheduled time for exclusive access the plurality of access tokens are expired without transmitting a message to each client to expire its respective access tokens;
    means for receiving a data I/O request associated with the access token, wherein the data I/O request is for data that is also accessible by one or more other clients of the plurality of clients each having a corresponding unexpired token, and wherein said time for exclusive access is a time when exclusive access to the data is required by a task;
    means for comparing a current system time with the access token's expiration time; and
    means for denying the data I/O request if the current system time is later than the access token's expiration time.

* * * * *